United States Patent
Dascalita et al.

(10) Patent No.: US 9,940,147 B2
(45) Date of Patent: Apr. 10, 2018

(54) SYSTEMS AND METHODS FOR PROVIDING INFORMATION FOR USE IN A RUNTIME COMPUTING ENVIRONMENT

(75) Inventors: Dragos Dascalita, Lasi (RO); Ionut-Maxim Margelatu, Bucharest (RO); Dragos Georgita, Bucharest (RO); Alin Achim, Bumbesti-Jiu (RO); Liviu-Aurelian Rau-Neacsu, Bucharest (RO); Costin Ionescu, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 2224 days.

(21) Appl. No.: 12/549,600

(22) Filed: Aug. 28, 2009

(65) Prior Publication Data
US 2011/0055271 A1 Mar. 3, 2011

(51) Int. Cl.
*G06F 9/44* (2006.01)
*G06F 9/455* (2018.01)
*G06F 9/445* (2018.01)
*G06F 11/36* (2006.01)

(52) U.S. Cl.
CPC .......... *G06F 9/45504* (2013.01); *G06F 9/445* (2013.01); *G06F 11/366* (2013.01)

(58) Field of Classification Search
CPC .............................. G06F 9/45505; G06F 9/445
USPC .......................................................... 726/6
See application file for complete search history.

(56) References Cited

U.S. PATENT DOCUMENTS

| | | | |
|---|---|---|---|
| 6,243,611 B1 * | 6/2001 | Hazama et al. | 700/97 |
| 6,327,702 B1 * | 12/2001 | Sauntry et al. | 717/118 |
| 6,708,276 B1 * | 3/2004 | Yarsa et al. | 726/6 |
| 7,516,445 B2 | 4/2009 | Maennel et al. | 717/125 |
| 7,552,438 B1 * | 6/2009 | Werme et al. | 718/104 |
| 7,747,559 B2 * | 6/2010 | Leitner et al. | 707/770 |
| 7,856,622 B2 * | 12/2010 | Lu | 717/127 |
| 8,156,469 B2 * | 4/2012 | Seeger et al. | 717/107 |
| 2008/0127156 A1 * | 5/2008 | Buza et al. | 717/166 |
| 2009/0199213 A1 * | 8/2009 | Webster et al. | 719/320 |
| 2009/0276767 A1 * | 11/2009 | Brannen et al. | 717/166 |

* cited by examiner

*Primary Examiner* — Grace Park
(74) *Attorney, Agent, or Firm* — Kilpatrick Townsend & Stockton LLP

(57) ABSTRACT

Systems and methods for providing information for use in a runtime environment that restricts access such information. An executable is launched prior to launching the runtime environment or runtime application. The executable retrieves information and makes that information available for use in the runtime, for example, by storing the information in a runtime file system area. The runtime or runtime application can then access the information. For example, the executable may retrieve information from a host operating system and then launch a runtime application that uses the information. An application that executes within a runtime and requires runtime external information can be provided as a bundle that includes an executable and the application itself. When the bundle is launched, the executable executes first to retrieve the information and make it available for the runtime. The runtime is then launched and provides the runtime application which can use the information.

20 Claims, 3 Drawing Sheets

SYSTEMS AND METHODS FOR PROVIDING INFORMATION FOR USE IN A RUNTIME COMPUTING ENVIRONMENT

FIELD

This disclosure generally relates to computer software that runs, displays, provides, or otherwise uses electronic content.

BACKGROUND

Various computer application runtime environments are available. Some runtime environments reside on top of a computer's more general operating system to provide a collection of software services while restricting access to operating system and other information external to the runtime. A runtime environment may also allow the use of applications within the runtime without allowing those applications to access certain application and system information. Exemplary system information includes, but is not limited to, processor type, frequency, memory, disk space available, operating system details, and video card details. Exemplary application information includes, but is not limited to, paths to already installed applications, application configuration information, initialization parameters, and other configuration details.

While there are various benefits to restricting access to certain information from a runtime environment, there are certain circumstances in which such information is required in the runtime environment. For example, diagnostic applications that are used to evaluate errors and other issues may require access to such information to evaluate, among other things, whether an error is the result of inadequate system resources or erroneous system configuration. Generally, it may be desirable for a runtime environment to restrict access to information within the runtime generally but to permit or facilitate access to such information in certain other circumstances. Alternatively, an existing runtime environment may restrict access to certain information and it may be desirable to add information access capability to the runtime without changing the runtime environment itself.

SUMMARY

Systems and methods are disclosed for providing information for use in a runtime computing environment. An executable is launched prior to launching a runtime environment or runtime application. The executable retrieves information and makes that information available for use in the runtime environment, for example, by storing the information in a runtime file system area. The runtime environment or runtime application can then access the information. For example, the executable may retrieve information from a host operating system and then launch a runtime application that uses the retrieved information. An application that is used within a runtime and requires runtime external information can be provided as a bundle that includes an executable and the application itself. When the bundle is launched, the executable retrieves the information and make it available for the runtime. The runtime is then launched and provides the runtime application which can use the information.

One exemplary embodiment comprises providing a runtime application on a computing device, where the runtime application is used within a runtime environment that restricts access to certain information. The runtime application is used or otherwise launched on the computing device by first launching an executable that retrieves the information that the runtime application cannot otherwise access and makes the information available for use by the runtime application. The runtime application is then launched and can access the information made available by the executable. In one exemplary embodiment, the executable makes the information available for use by the runtime application by storing the information in a file in a runtime file system area accessible by the runtime application. In another exemplary embodiment, the executable is started as a process and makes the information available by using sockets to pass the information to the runtime application. In one exemplary embodiment, the executable and the runtime application are stored as a single package on the computing device. Launching that package initiates launch of both the executable and the runtime application.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

Systems and methods are disclosed for providing information for use in a runtime environment. For example, a runtime environment may provide a collection of software services that are available during its use but restrict access to operating system and other information. A runtime environment may also allow the use of applications within the runtime, but restrict access to certain information. Exemplary system information includes, but is not limited to, processor speed and type, frequency, physical memory, RAM memory, disk space available, operating system version and details, video card type and details, and/or operating system volume, etc. Exemplary application information includes, but is not limited to, paths to installed applications, initialization parameters, and configuration details.

One embodiment provides an executable that is launched prior to launching a runtime environment. The executable retrieves information and makes that information available for use in the runtime. The runtime then launches and accesses the information. For example, the executable may retrieve information from a host operating system and then launch the runtime. In one embodiment, an application that is used within a runtime and requires runtime external information is provided as a bundle that includes both an executable and the application itself. When the bundle is launched, the executable retrieves the information and make it available for the runtime. The runtime is then launched and provides the application in the runtime environment.

Generally, information can be made available to a runtime or runtime application in a variety of ways. For example, such information may be stored in a text file, a database, or other memory location which is provided to or made available to the runtime. For example, if a runtime has its own file system or other storage area, a file containing the retrieved information could be stored in this storage area and then accessed from within the runtime. As another example, the executable that retrieves the information could be started as a process and then use sockets to communicate with the runtime application to pass the retrieved information.

These illustrative examples are given to introduce the reader to the general subject matter discussed herein and are not intended to limit the scope of the disclosed concepts. The following sections describe various additional embodiments and examples.

Illustrative Computing Environment

Figure 1:
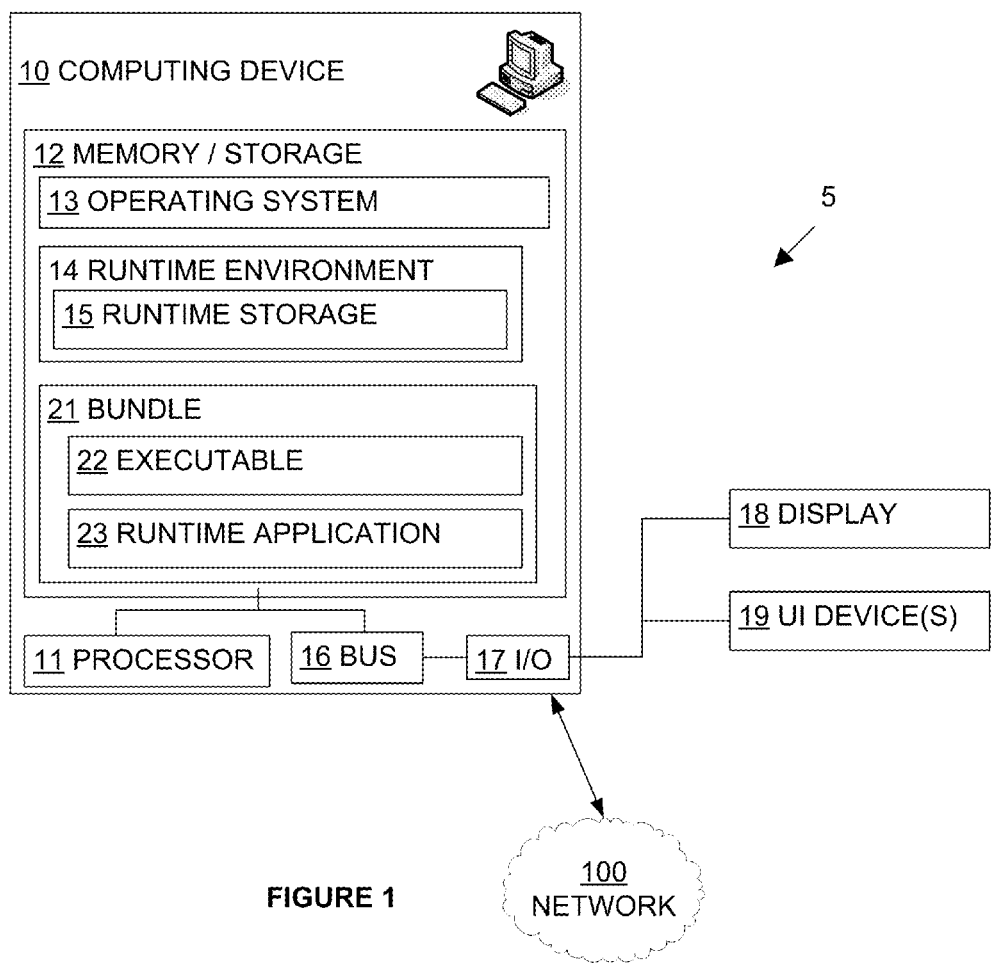
FIG. 1 is a system diagram illustrating an illustrative computing environment.

Referring now to the drawings in which like numerals indicate like elements throughout the several Figures, FIG. 1 is a system diagram illustrating an illustrative computing environment 5 according to certain embodiments. Other embodiments may be utilized. The computing environment 5 comprises a computing device 10 that is connected to a wired or wireless network 100. Exemplary applications that execute on the computing device 10 are shown as functional or storage components residing in memory 12. The memory 12 may be transient or persistent. As is known to one of skill in the art, such applications may be resident in any suitable computer-readable medium and execute on any suitable processor. For example, the computing device 10 may comprise a computer-readable medium such as a random access memory (RAM) coupled to a processor 11 that executes computer-executable program instructions and/or accesses information stored in memory 12. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 100 shown comprises the Internet. In other embodiments, other networks, intranets, combinations of networks, or no network may be used. The computing device 10 may also comprise a number of external or internal devices such as a mouse, a CD-ROM, DVD, a keyboard, a display, audio speakers, or other input or output devices. For example, the computing device 10 includes input/output connections 17, connecting a display 18 and various user interface devices 19. The computer device 10, depicted as a single computer system, may be implemented as a network of computers, servers, or processors. Examples of a server device are servers, mainframe computers, networked computers, a processor-based device, and similar types of systems and devices.

A computing device, such as exemplary computing device 10, can utilize various functional components to implement one or more of the features described herein. Computing device 10 has an operating system 13 for operating the computing device 10 and a runtime environment 14 for providing runtime specific functionality and applications. The exemplary computing device 10 includes a package or bundle 21 that comprises an executable 22 and a runtime application 23. The executable 22 can be used directly from the operating system 13, while the runtime application 23 is used within the runtime. When the bundle 21 is started, the executable retrieves any necessary information, such as information about the computing device 10, its operating system 13, or other components, or about any applications installed or previously used on the computing device 10. The executable 22 can provide such information for use by the runtime application 23 which may be otherwise unable to access the same information, for example, because of limitations or restrictions imposed by the runtime environment 14. In one example, the executable 22 retrieves operating system and other information and provides that information for storage within a runtime storage 15 associated with and accessible from within the runtime environment 14.

This illustrative computing environment 5 is provided merely to illustrate a potential environment that can be used to implement certain embodiments. Other computing devices and configurations may alternatively or additionally be utilized.

Exemplary Methods for Providing Information for Use in a Runtime Computing Environment Certain embodiments provide information for use in a runtime environment, such as the Adobe® AIR™. Adobe® AIR™ is a runtime environment that resides on top of an operating system and is used to run a variety of applications, including rich Internet applications (RIAs) that typically provide better graphical and interactive experiences than traditional web browser content. Adobe® AIR™ applications have limited access to system operating information and local settings information. One exemplary embodiment provides an Adobe® AIR™ application with information about the operating system and/or information about one or more Adobe® AIR™ applications.

A variety of techniques can be used to pass information to an application operating in a runtime in which there is limited access to system information. Such information can be provided before launching the runtime. For example, a C++ application, Java application, Visual Basic application, or other separate executable program can be used to retrieve information from the host system prior to launching a runtime application that will then use the information. The separate executable program may provide the gathered information to the runtime or a runtime application in various ways. Information may be stored in a database or other memory area and/or passed directly to the application. The separate executable could output information into a text file, another memory storage area, or place the information in an runtime-specific file system area that a runtime application can access, as examples. In an alternative embodiment, the separate executable may be started as a process and sockets can be used to communicate with the runtime or runtime application to pass the information.

In the context of a diagnostic application running in a runtime environment, the diagnostic application may need to determine if the device meets the minimum system requirements. For example, such information may help such a diagnostic application determine whether recent changes on a systems, e.g., removing some RAM, result in the system no longer meeting certain minimal system requirements. If the user does not have permission to access the required information, the application gives a message.

One embodiment provides use of a separate executable with a runtime diagnostic application, such as one running on Adobe® AIR™. Such an exemplary diagnostic application can be a desktop application stored as an package comprising both the diagnostic application and a separate executable. The package can be configured so that when launched, the separate executable launches prior to launching the runtime that runs the diagnostic application. The separate executable can obtain information for later use by the diagnostic application in the runtime by providing the application to the diagnostic application or at a location accessible by the diagnostic application.

An exemplary diagnostic application used in a runtime environment may be used to diagnose errors occurring in one or more other applications running on the computer both within and external to the runtime environment. Accordingly, information provided to a diagnostic application may relate to general and system level information for example about the operating system and/or may relate to information about an application that is being examined by the diagnostic application. Information about the application to be examined, for example, may have been stored as a log file on the computer. At launch, the diagnostic application may be provided with or provided access to such information from the log file by the separate executable. The exemplary diagnostic application can use the log file information, general or system information, and/or information retrieved from other sources including, but not limited to, external servers to diagnose and correct errors.

If a user is not able to diagnose or correct an error, a diagnosis application may be able to provide the log information and/or other relevant information to the user for contacting an external diagnosis source such as a help line. For example, the log file and/or other information may be uploaded to a remote server and the user may be able to call a help line and discuss the error with a specialist who will have access to the log file and other information. A diagnostic application may send such information to a collection point which stores logs and other information including the results of diagnostics from multiple systems and users. A collection point may allow statistical and other forms of analysis to be used to allow an application provider to better understand the nature and extent of errors that occur during use of their applications.

Figure 2:
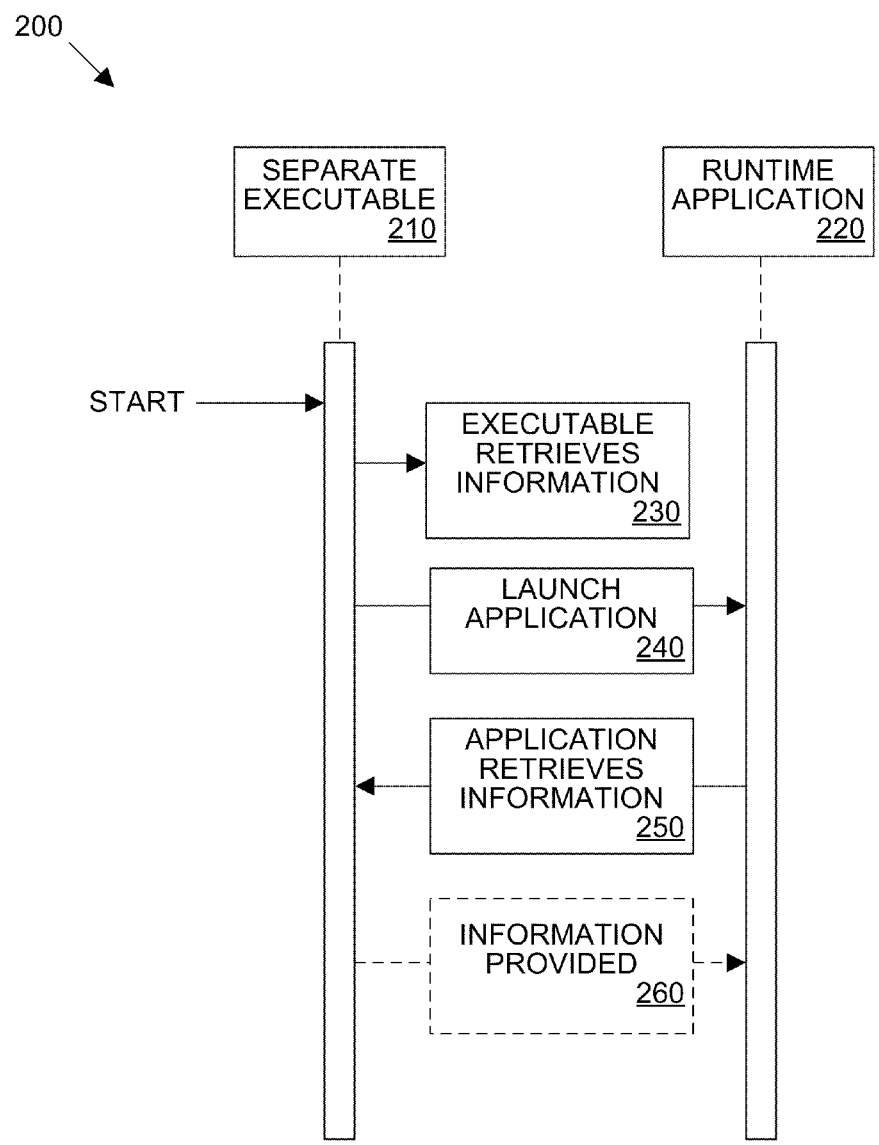
FIG. 2 is a flow chart illustrating an exemplary method of providing information for use in an exemplary runtime computing environment.

FIG. 2 is a flow chart illustrating an exemplary method 200 of providing information for use in an exemplary runtime computing environment. The exemplary method 200 involves the use of a separate executable 210 and a runtime application 220. For example, a separate executable and a runtime application may be provided and/or stored as a bundle on a computer device, such as in the exemplary bundle 21 depicted in FIG. 1.

The method 200 involves using the runtime application by first starting the separate executable. The method 200 involves the executable retrieving information as shown in block 230. Such information may be some or all of the information that is not available to the runtime application. Such information may include general or other system information such as processor speed and type, frequency, physical memory, RAM memory, disk space available, operating system version and details, video card type and details, and/or operating system volume, etc. Such information may alternatively or additionally include information about paths to already installed applications used on the computing device within or outside of the runtime, application initialization parameters, and other application configuration details.

After retrieving the information using the separate executable 210, the method 200 involves launching the runtime application 220, as shown in block 240. This may involve first launching the runtime environment, if such environment is not already launched, and then launching the runtime application 220 within that environment. In alternative embodiments, the separate executable 210 and the runtime application 220 are launched concurrently. In still other alternative embodiments, the runtime application 220 is launched first and the separate executable is launched when information not accessible from within the runtime is needed.

Returning to the exemplary method 200 of FIG. 2, after launch of the runtime application 220, the runtime application 220 retrieves the information, as shown in block 250. In this example, the runtime application 220 requests the information from the separate executable 210 or from a memory location associated with the separate executable 210. In one exemplary embodiment, the separate executable continues execution until the information is provided to the runtime application 220. In another exemplary embodiment, the separate executable concludes operation after retrieving the information and storing the information in a location accessible by the runtime application 220.

The information is provided to the runtime application 220, as shown in block 260. This can occur in a variety of ways depending upon the particular circumstances and features implemented by the runtime and/or by the application. The separate executable 210 may be configured to directly provide the information upon request by the runtime application 220. For example, the separate executable 210 could be started as a process and sockets could be used to communicate with the runtime application 220 to pass the information.

Figure 3:
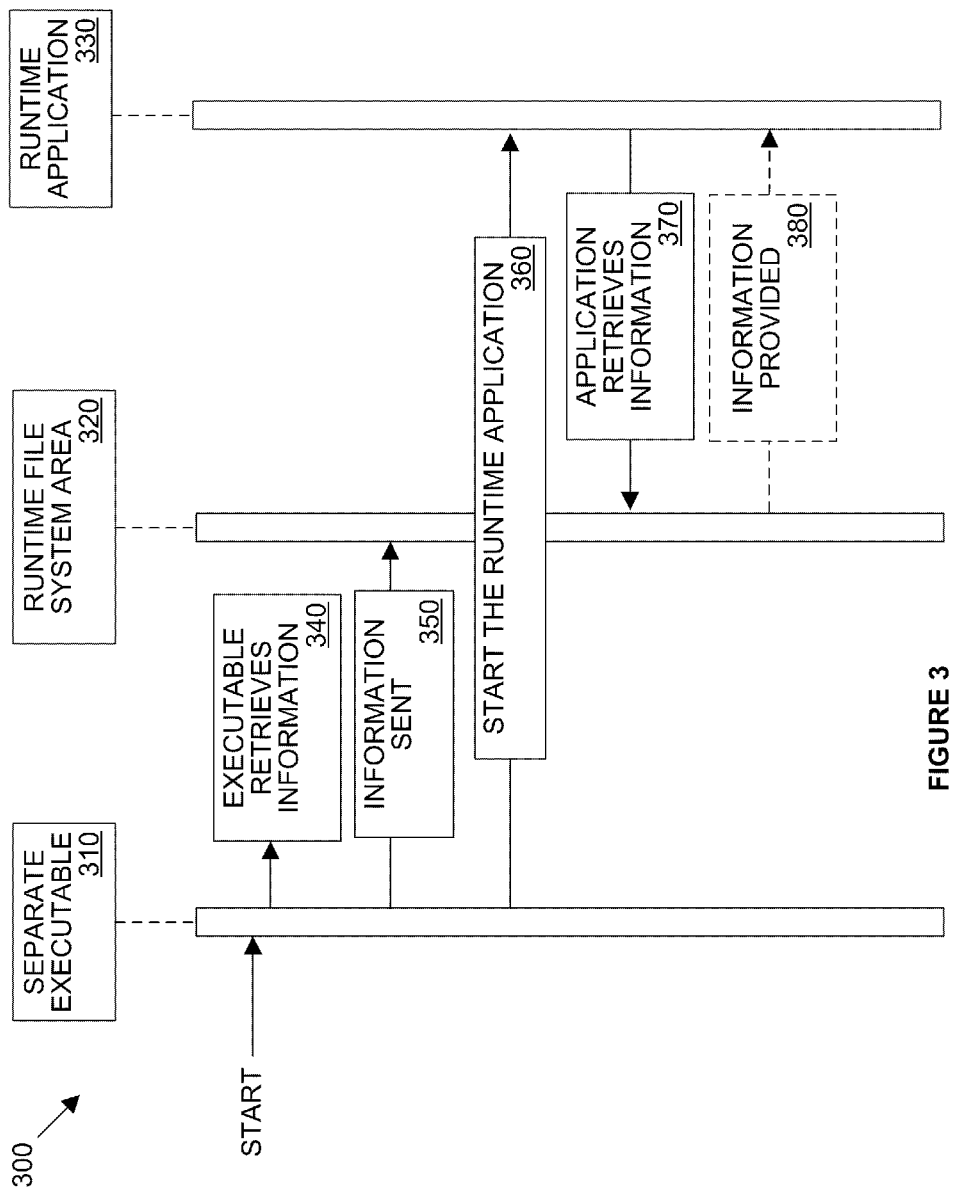
FIG. 3 is a flow chart illustrating another exemplary method of providing information for use in an exemplary runtime computing environment.

FIG. 3 is flow chart illustrating another exemplary method 300 of providing information for use in an exemplary runtime computing environment. The exemplary method 300 involves the use of a separate executable 310, a runtime file system area 320, and a runtime application 330. As with the previous example of FIG. 2, the separate executable 310 and a runtime application 330 may or may not be provided and/or stored as a bundle on a computer device, such as in the exemplary bundle 21 depicted in FIG. 1. The runtime file system area 320 of this example is accessible from within the runtime environment that runs the runtime application 330. For example, the runtime environment 14 of FIG. 1 could be used to run runtime application 23 and the runtime storage 15 could be used to store information provided by the executable 22 for access by the runtime application 23 and other applications in the runtime environment 14. The runtime file system area 320 depicted in FIG. 3 can be local to the computing device upon which the runtime is provided or can be located elsewhere, for example, at a network or Internet location accessible from the computing device.

The method 300 can begin in a variety of states. For example, the runtime environment used to run the runtime application 330 may or may not already be running. Generally, separate from the runtime environment, the method 300 begins when the separate executable 310 retrieves information 340 for use by the runtime application, as shown in block 340. The separate executable can access information about the system, operating system, computing environment, available networks, peripheral devices and/or a variety of other types of information in any suitable ways generally known and used by applications executing through an operating system on a network or otherwise. The separate executable may, as an example, access a registry used and/or maintained by an operating system on the computing device.

After the executable retrieves the information, the method 300 further involves sending the information retrieved by the separate executable 310 to the runtime file system area 320, as shown by block 350. Storing or providing the information in the runtime file system area 320 can be accomplished in a variety of techniques. For example, the information may be compiled into one or more new files that are stored in the runtime file system area 320. Alternatively, the information may be added to existing files or logs maintained in the runtime file system area.

The method 300 involves launching the runtime application 330, as shown in block 360. This can occur before or after block 350 depending upon the circumstances. In some circumstances, the information may need to be sent to the runtime file system area 320 prior to launching the runtime environment and/or the runtime application 330. Generally, launching the runtime application 330 may involve first launching the runtime environment, if such environment is not already launched, and then launching the runtime application 330 within that environment.

Once launched the runtime application 330 can retrieve the information, as shown in block 370, and the information is provided to the runtime application, as shown in block 380. The information can be retrieved immediately upon application launch or retrieved on an as needed basis. The runtime application may further interact with the runtime file system area 320 to update the information, for example, by adding additional information from within the runtime environment or location accessible from within the runtime environment.

Generally, in addition to the examples previously discussed information can be retrieved and provided to a runtime environment or runtime application in a variety of ways the details of which may depend upon the specific details of the runtime environment or runtime application.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
   providing a runtime application on a computing device, the runtime application used within in a runtime environment on the computing device, wherein the runtime application cannot access information within the runtime environment;
   using the runtime application on the computing device by:
      launching an executable on the computing device, wherein the executable retrieves the information that the runtime application cannot access from within the runtime environment and makes the information available for use by the runtime application; and
      launching the runtime application, wherein the runtime application can access the information made available by the executable.

2. The method of claim 1 wherein the executable makes the information available for use by the runtime application by storing the information in a file in a runtime file system area accessible by the runtime application.

3. The method of claim 1 wherein the executable is started as a process, wherein the executable makes the information available for use by the runtime application using sockets to pass the information to the runtime application.

4. The method of claim 1 wherein the executable and the runtime application are stored as a single object on the computing device, wherein launching the single object initiates launch of both the executable and the runtime application.

5. The method of claim 1 wherein the information specifies: processor speed, processor type, physical memory size, RAM size, disk space available, operating system version, or video card type.

6. The method of claim 1 wherein the information specifies a path to another applications on the computing device.

7. The method of claim 1 wherein the launching the executable occurs before launching the runtime application.

8. The method of claim 1 wherein the launching the executable occurs while the runtime environment is not running.

9. The method of claim 1 wherein the runtime environment is Adobe AIR that runs on top of an operating system on the computing device, wherein the information is information about the operating system.

10. The method of claim 1 wherein the runtime application is a diagnostic application that requires the information to diagnose errors.

11. A computing apparatus comprising:
   a runtime environment specified by instructions on the computing apparatus, wherein the runtime environment running on an operating system of the computing apparatus restricts access to information; and
   a package specified by instructions on the computing apparatus, wherein launching the package comprises:
      launches an executable on the computing apparatus, wherein the executable retrieves the information that a runtime application cannot access from within the runtime environment and makes the information available for use by the runtime application; and
      launches the runtime application, wherein the runtime application can access the information made available by the executable.

12. The computing apparatus of claim 11 wherein launching the package further comprises running the runtime environment after launching the executable.

13. The computing apparatus of claim 11 wherein the executable makes the information available for use by the runtime application by storing the information in a file in a runtime file system area accessible by the runtime application.

14. The computing apparatus of claim 11 wherein the executable is started as a process, wherein the executable makes the information available for use by the runtime application using sockets to pass the information to the runtime application.

15. The computing apparatus of claim 11 wherein the information specifies: processor speed, processor type, physical memory size, RAM size, disk space available, operating system version, or video card type.

16. The computing apparatus of claim 11 wherein the runtime environment is Adobe AIR and wherein the information is information about the operating system.

17. The computing apparatus of claim 11 wherein the runtime application is a diagnostic application that requires the information to diagnose errors.

18. A computer-readable medium on which is encoded program code, the program code comprising:
- program code for providing a runtime application on a computing device, the runtime application used within in a runtime environment on the computing device, wherein the runtime application cannot access information within the runtime environment;
- program code for launching the runtime application on the computing device by:
  - launching an executable on the computing device, wherein the executable retrieves the information that the runtime application cannot access from within the runtime environment and makes the information available for use by the runtime application; and
  - launching the runtime application, wherein the runtime application can access the information made available by the executable.

19. The computer-readable medium of claim 18 wherein the executable makes the information available for use by the runtime application by storing the information in a file in a runtime file system area accessible by the runtime application.

20. The computer-readable medium of claim 18 wherein the executable is started as a process, wherein the executable makes the information available for use by the runtime application using sockets to pass the information to the runtime application.

* * * * *